United States Patent
Turgeman

(10) Patent No.: US 12,223,419 B2
(45) Date of Patent: Feb. 11, 2025

(54) CONTROLLING PERFORMANCE OF DEPLOYED DEEP LEARNING MODELS ON RESOURCE CONSTRAINED EDGE DEVICE VIA PREDICTIVE MODELS

(71) Applicant: International Business Machines Corporation, Armonk, NY (US)

(72) Inventor: Lior Turgeman, Moreshet (IL)

(73) Assignee: International Business Machines Corporation, Armonk, NY (US)

( * ) Notice: Subject to any disclaimer, the term of this patent is extended or adjusted under 35 U.S.C. 154(b) by 1012 days.

(21) Appl. No.: 16/550,290

(22) Filed: Aug. 26, 2019

(65) Prior Publication Data

US 2021/0064981 A1 Mar. 4, 2021

(51) Int. Cl.
| | | |
|---|---|---|
| *G06N 3/08* | (2023.01) | |
| *G06F 8/60* | (2018.01) | |
| *G06N 3/084* | (2023.01) | |
| *G06N 3/10* | (2006.01) | |

(52) U.S. Cl.
CPC ............... *G06N 3/08* (2013.01); *G06F 8/60* (2013.01); *G06N 3/084* (2013.01); *G06N 3/10* (2013.01)

(58) Field of Classification Search
CPC . G06N 3/08; G06N 3/084; G06N 3/10; G06F 8/60
See application file for complete search history.

(56) References Cited

U.S. PATENT DOCUMENTS

| | | |
|---|---|---|
| 9,547,828 B2 | 1/2017 | Mermoud et al. |
| 9,794,145 B2 | 10/2017 | Vasseur et al. |
| 2009/0113049 A1* | 4/2009 | Nasle ................. G06N 3/10 709/224 |
| 2015/0245160 A1* | 8/2015 | Agrawal ............. H04L 41/145 455/406 |
| 2015/0348065 A1 | 12/2015 | Doganata et al. |
| 2017/0017212 A1* | 1/2017 | Collins ............... G05B 13/027 |
| 2017/0199542 A1* | 7/2017 | Sylvester ............. G06F 1/3253 |
| 2017/0261949 A1* | 9/2017 | Hoffmann ............. G06N 7/01 |
| 2018/0247192 A1* | 8/2018 | Fick ..................... G06N 3/0635 |
| 2018/0257225 A1* | 9/2018 | Satou .................... B25J 9/1697 |
| 2018/0287806 A1* | 10/2018 | Carboni ............... H04W 12/06 |

(Continued)

FOREIGN PATENT DOCUMENTS

| | | |
|---|---|---|
| CN | 110032449 A | 7/2019 |
| WO | 2018148293 A1 | 8/2018 |
| WO | 2019/022737 A1 | 1/2019 |

OTHER PUBLICATIONS

J. Chen and X. Ran, "Deep Learning With Edge Computing: A Review," in Proceedings of the IEEE, vol. 107, No. 8, pp. 1655-1674, Jul. 15, 2019, doi: 10.1109/JPROC.2019.2921977. (Year: 2019).*

(Continued)

*Primary Examiner* — James D. Rutten
(74) *Attorney, Agent, or Firm* — Teddi E. Maranzano

(57) ABSTRACT

An example system includes a processor to receive a data input and a predicted performance of a Deep Learning (DL) model deployed on a resource constrained edge device from a predictive model. The processor is to modify a control input for the DL model based on the data input and the predicted performance. The processor is to send the control input to the deployed DL model to modify performance of the DL model.

20 Claims, 10 Drawing Sheets

(56) References Cited

U.S. PATENT DOCUMENTS

| | | | |
|---|---|---|---|
| 2018/0330275 A1 | 11/2018 | Jain et al. | |
| 2018/0332116 A1* | 11/2018 | George | G06F 8/60 |
| 2018/0348715 A1* | 12/2018 | Bandaru | G06F 9/5083 |
| 2019/0156484 A1* | 5/2019 | Nye | G16H 30/20 |
| 2019/0353376 A1* | 11/2019 | Rigg | F24F 11/67 |
| 2020/0034197 A1* | 1/2020 | Nagpal | G06F 9/50 |
| 2020/0057689 A1* | 2/2020 | Farahat | G06F 11/0751 |
| 2020/0218991 A1* | 7/2020 | Alanqar | F24F 11/62 |
| 2020/0219007 A1* | 7/2020 | Byers | G06F 9/50 |
| 2020/0380306 A1* | 12/2020 | Hada | G06N 3/048 |
| 2021/0025383 A1* | 1/2021 | Bodishbaugh | F04B 47/02 |

OTHER PUBLICATIONS

Murshed et al., "Machine Learning at the Network Edge: A Survey", Jul. 31, 2019, arXiv, accessed online at <https://arxiv.org/abs/1908.00080> (Year: 2019).*

T. Sirojan, T. Phung and E. Ambikairajah, "Enabling Deep Learning on Embedded Systems for IoT Sensor Data Analytics: Opportunities and Challenges," 2018 IEEE International Conference on Information and Automation for Sustainability (ICIAfS), 2018, pp. 1-5, doi: 10.1109/ICIAFS.2018.8913352. (Year: 2018).*

D. Sarabia-Jacome, I. Lacalle, C. E. Palau and M. Estevé, "Efficient Deployment of Predictive Analytics in Edge Gateways: Fall Detection Scenario," 2019 IEEE 5th World Forum on Internet of Things (WF-IoT), Limerick, Ireland, 2019, pp. 41-46, doi: 10.1109/WF-IoT.2019.8767231. (Year: 2019).*

Chinese Patent Office, "Office Action" Apr. 29, 2024, 9 pages, Application No. 202010861510.3.

* cited by examiner

300

CONTROLLING PERFORMANCE OF DEPLOYED DEEP LEARNING MODELS ON RESOURCE CONSTRAINED EDGE DEVICE VIA PREDICTIVE MODELS

BACKGROUND

The present techniques relate to deployed Deep Learning (DL) models. More specifically, the techniques relate to controlling deployed DL models.

SUMMARY

According to an embodiment described herein, a system can include processor to receive a data input and a predicted performance of a DL model deployed on a resource constrained edge device from a predictive model. The processor can also further modify a control input for the DL model based on the data input or its predicted performance. The processor can also send the control input to the deployed DL model to modify performance of the DL model.

According to another embodiment described herein, a method can include monitoring, via a processor, an input data and a predicted performance of a DL model from a predictive model. The method can further include modifying, via the processor, a control input based on the input data and the predicted performance of the DL model. The method can also further include sending, via the processor, the modified control input to the DL model.

According to another embodiment described herein, a computer program product for controlling deployed DL models can include computer-readable storage medium having program code embodied therewith. The computer readable storage medium is not a transitory signal per se. The program code executable by a processor to cause the processor to monitor an input data and a predicted performance of a DL model from a predictive model. The program code can also cause the processor to modify a control input based on the input data and the predicted performance of the DL model. The program code can also cause the processor to send the modified control input to the DL model.

DETAILED DESCRIPTION

Figure 1:
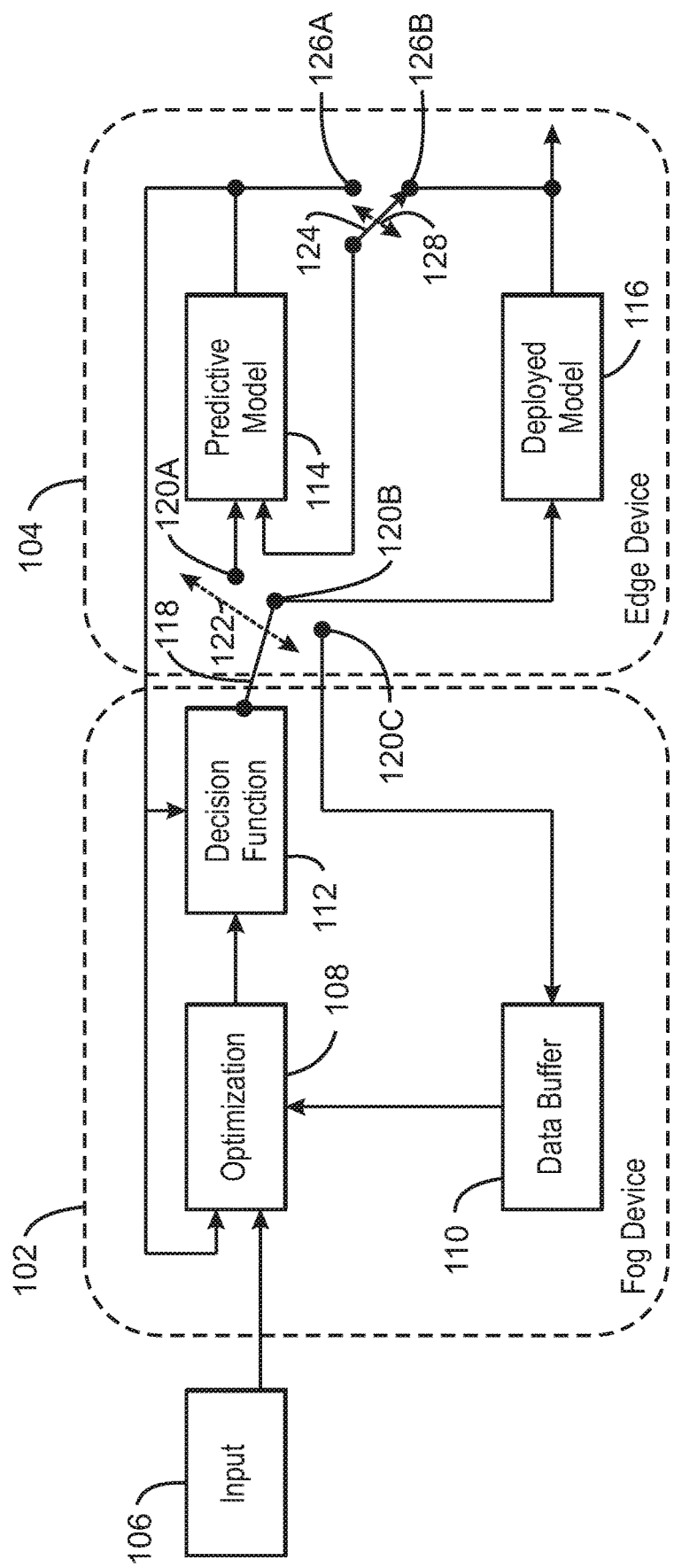
FIG. 1 is a block diagram of an example system for controlling deployed DL models via a predictive model.

With the introduction of Internet of Things (IoT) and intelligent edge devices, planning for the entire lifecycle of machine learning (ML) models may include data collection and training, and deployment and monitoring. Deploying ML models outside of the cloud directly into mobile apps may include the additional challenges of supporting multiple platforms, hundreds of chipsets, and billions of installs. Furthermore, for the case of Deep Learning models (DL), a higher performance compared to other ML models is achieved at the expense of much higher computational cost or memory consumption at runtime.

In addition, when deploying DL models into mobile devices, the conditions in which the mobile app will be used may be detected, and training data may be augmented accordingly. For example, a model may achieve high accuracy of detection on bright images from a training dataset, but may perform poorly in some actual low light settings encountered by smartphone users. Applying different techniques of data augmentation in response to new conditions may thus improve the performance of DL models in production.

After an app is deployed, a system may thus continue to collect data, capture inputs and outputs of models running on devices and monitor accuracy to improve models over time. However, unlike cloud environments, which are characterized with robust logging infrastructure, deploying models onto mobile devices may leave developers without any ability to monitor the models' performance. For example, collecting data and monitoring accuracy may include measuring runtime performance, memory usage, battery drain, accuracy, and all of this across heterogeneous hardware, in order to make sure the DL model runs efficiently, and that there is no decrease in expected model performance. However, mobile devices may be resource constrained and therefore not able to perform all this resource-intensive analysis of DL model performance after deployment. Moreover, in some cases the mobile devices may be in an offline status and thus deployed models on the offline mobile devices may be unavailable to be directly monitored by a cloud service.

According to embodiments of the present disclosure, a processor can receive a data input and a predicted performance of a DL model deployed on a resource constrained edge device from a predictive model. The processor can modify a control input for the DL model based on the data input and the predicted performance. The processor can then send the control input to the deployed DL model to modify performance of the DL model. Thus, techniques described herein enable efficient monitoring of deployed DL models on resource constrained edge devices by using model predictive control based on a receding horizon technique. For example, a predictive model may predict the deployed model response over a specified time horizon. The techniques thus provide a trained predictive model that plays the role of a controller, which monitors and alters the performance of the deployed model.

With reference now to FIG. 1, a block diagram shows an example system for controlling deployed DL models via a predictive model. The example system 100 can be implemented using the computing devices 500A and 500B of FIG. 5B, or the processor 602 of the computer-readable media 600A and 600B using the method 400 of FIG. 4. FIG. 1 includes a fog layer 102 communicatively coupled to an edge layer 104. For example, the fog layer 102 may be a cloud layer that includes one or more servers used to orchestrate a number of computing devices in the edge layer 104. For example, the edge layer 104 may include a number of edge devices, such as mobile devices. An example edge device is shown in computing device 500B of FIG. 5B. The system 100 includes an input 106 received at the fog layer 102. For example, the input may be any suitable data input, such as an image or other form of data to be processed. The fog layer 102 includes an optimization unit 108 coupled to a data buffer 110 and a decision function unit 112. The edge layer 104 includes a predictive model 114 intermittently coupled to a deployed model 116.

The fog layer 102 further includes a first switch 118 that may be coupled to nodes 120A, 120B, and 120C. The switch 118 may toggle coupling between nodes 120A, 120B, and 120C as indicated by an arrow 122. In the example of FIG. 1, the first switch 118 is set to be coupled to node 120B. The edge layer 104 also includes a second switch 124. The second switch 124 may be coupled to nodes 126A and 126B. The second switch 124 may toggle coupling between nodes 126A and 126B, as indicated by an arrow 128. For example, the second switch 124 may toggle to node 126A when the when the first switch 118 is toggled to node 120A. The second switch 124 may toggle to node 126B when the first switch 118 is toggled to node 120B.

In the example of FIG. 1, a performance control system 100 includes the deployed model 116 to be controlled, a predictive model 114 that models the performance of the deployed model 116, an optimization unit 108 that determines the input required to produce a target performance for the deployed model 116, a decision function unit 112 that decides either to switch to the deployed model 116 in case the optimization unit 108 has solved for the best input, or, between samples, to the predictive model 114. The optimization unit 108 uses the predictive model 114 to calculate the next control input from the predictions of the predictive model 114. Once the objective function has been minimized the input is delivered to the deployed model 116.

Still referring to FIG. 1, the system 100 may start with the input signal 106, in(n), which is presented to the optimization unit 108. The optimization unit 108 produces an output signal, d(n), which is presented to the decision function unit 112. The decision function unit 112 produces an output that is either used as an input to the predictive model 114 via node 120A, to the deployed model 116 via node 120B, or to the data buffer 110 via node 120C. For example, the switch 118 may be set to the deployed model 116 when the optimization unit 108 has solved for a best control input that optimizes a predefined cost function. In various examples, between samples, the switch 118 may be set to the predictive model 114. For example, the optimization unit 108 can use the output of the predictive model 114 to calculate the next control input from the predictions (pred(n)) of the deployed model 116. Once the optimization unit 108 minimizes a cost function, the control input may be passed to the deployed model 116. For example, the control input may be a number of parameter settings for the deployed model 116.

As one example use case scenario, if the deployed model 116 is to analyze video input 106 in real-time, the system 100 may be used to ensure that a deployed model 116 runs at least 30 frames per second on all the target mobile devices in the edge layer 104. In some examples, the system 100 may also set up alerts that notify developers when there are significant changes to input data, predictions that may indicate a failure, or a change in the way people are using their application. In such a case, the input 106 is a set of frames. The processing of each of the frames may take a different amount of time and resources. For example, each frame may use a different amount of memory or battery resources. As one example, depending on the size of the batch of input 106 being processed, as well as on other image parameters, processing may be more efficient, but may use more resources, such as memory. The optimization unit 108 may then determine an optimal batch size to be used in order to maximize the overall throughput of the inferencing over a specified horizon. The specified horizon may be a predefined amount of time. In various examples, the system 100 may perform an optimization, followed by a prediction, and then a decision. For example, the system 100 may perform the following algorithm:

Initialize j
pred (n)=M_p (In (n),s_i)
While J (N, pred (n))}>$\zeta$ do
Repeat
D←In (n)
j=j+1
pred (n+j)=M_p (In(n+j), s_i) {i∈R:1≤i≤n}
u (n+j)↓arg min {J (N,pred(n+j))}
end do
Return u
For s ∈ L
Y(u)={M_d (u)}
s_i(u)=K(M_d (u), Y(u))
Train M_p (u,s_i (u))
end where M_d is the deployed model, M_p is the predictive model, In is the new incoming data, s_i is a set of edge related performance metrics, D is a data buffer, J is a cost function, N is a costing horizon, u is a control signal, $\zeta$ is a threshold value, and K is a performance estimator.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional input, layers, models, or additional data buffers, units, etc.).

Figure 2:
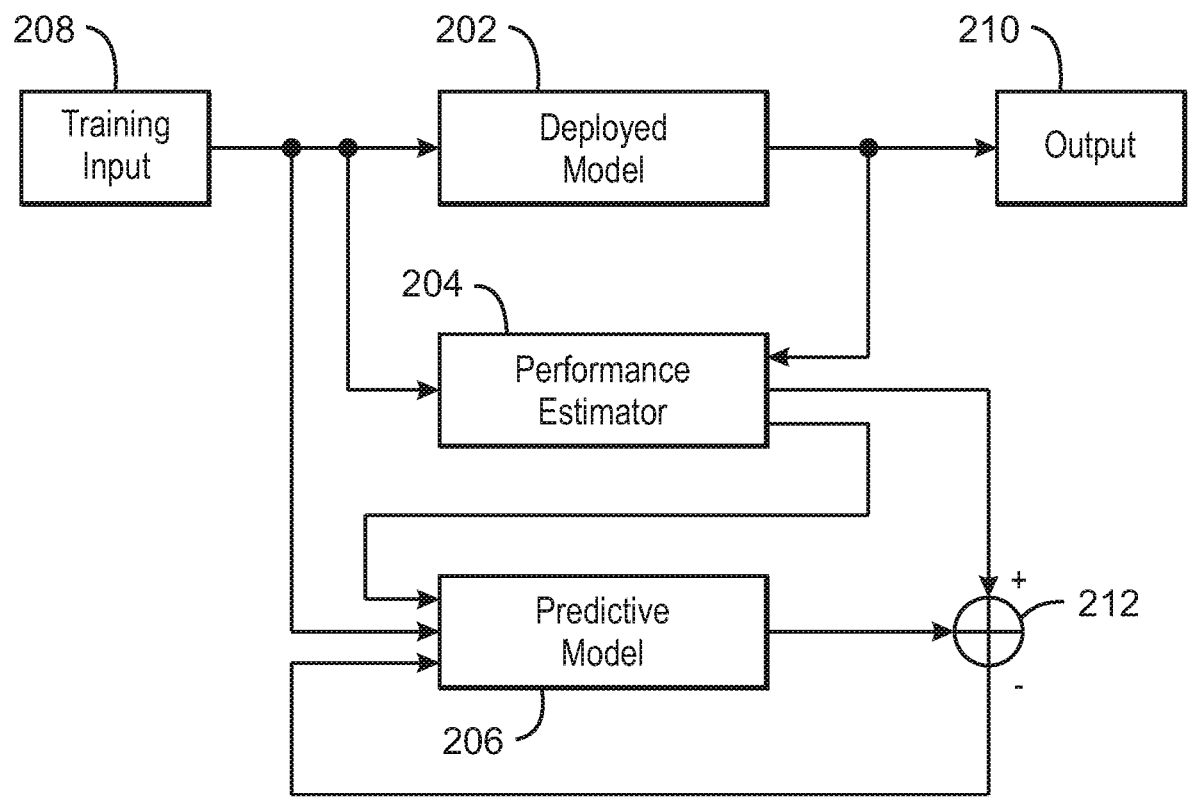
FIG. 2 is a block diagram of an example system for training a predictive model to be used for controlling deployed DL models.

FIG. 2 is a block diagram that shows an example system for training a predictive model to be used for controlling deployed DL models. The example system 200 can be implemented using the computing device 500A of FIG. 5A or the processor 602 of the computer-readable medium 600A using the method 300 of FIG. 3. FIG. 2 includes a deployed model 202 coupled to a performance estimator 204. For example, the deployed model 202 may be the deployed model 116 of FIG. 1. The performance estimator 204 is further coupled to a predictive model 206 and may be used to estimate a performance of the deployed model 202 given a training input 208. For example, the predictive model 206 may be the predictive model 114 of FIG. 1. The deployed model 202 may generate an output 210 based on the training input 208. For example, the output 210 may be a detection or classification of the training input 208. The predictive model 206 is coupled to a predictive error calculator 212.

In the example of FIG. 2, before using the predictive model 206 as a controller as described in FIG. 1, the predictive model 206 may be trained to learn the forward dynamics of the deployed model 202. For example, by applying a range of input 208 to the deployed model 202, corresponding outputs 210 can be obtained. The system 200 may then select a set of training patterns based on the outputs 210. Once the predictive model 206 is trained with the collected data, the predictive model 206 may be used to predict the future performance of the deployed model 202, in terms of edge performance related metrics. For example, the edge performance related metrics may include runtime performance, or memory usage, or battery drain, or accuracy, among other performance related metrics. In various examples, the predictions from the predictive model 206 may then be used by an optimization algorithm to determine the control input that minimizes a pre-defined performance criterion over a specified time horizon as described in FIG. 1.

As shown in FIG. 2, the predictive model and the deployed model 202 receive the same input 208 In(n). In various examples, the performance estimator 204 calculates a selected edge related metric, such as inference time, memory usage, battery drain, etc. The predictive model 206 may also have an additional input that either comes from the performance estimator 204. In various examples, the additional input assists the predictive model with capturing the dynamics of the deployed model 202. For example, if the deployed model 202 is a Deep Neural Network (DNN) model, the dynamics of the deployed model 202 may include the time it takes for the DNN model to perform inference for training data 208 including a given set of input images. The predictive error calculator 212 may calculate a predictive error between the responses of the network, pred(n), and the output of the performance estimator, perf(n). The predictive error may then be used to update the structure of the predictive model 206. For example, a number of parameters of the predictive model 206 may be modified based on the predictive error. In some examples, this process is repeated until the predictive error is reduced to a predefined level of insignificance. For example, the process may be repeated until the predictive error does not exceed a predetermined error threshold. As one examples, if the predictive model 206 is a neural net, the training data 208 may cover an entire range of deployed model operation because nonlinear neural networks may not extrapolate accurately.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional training inputs, deployed models, outputs, models, or additional performance estimators, etc.).

Figure 3:
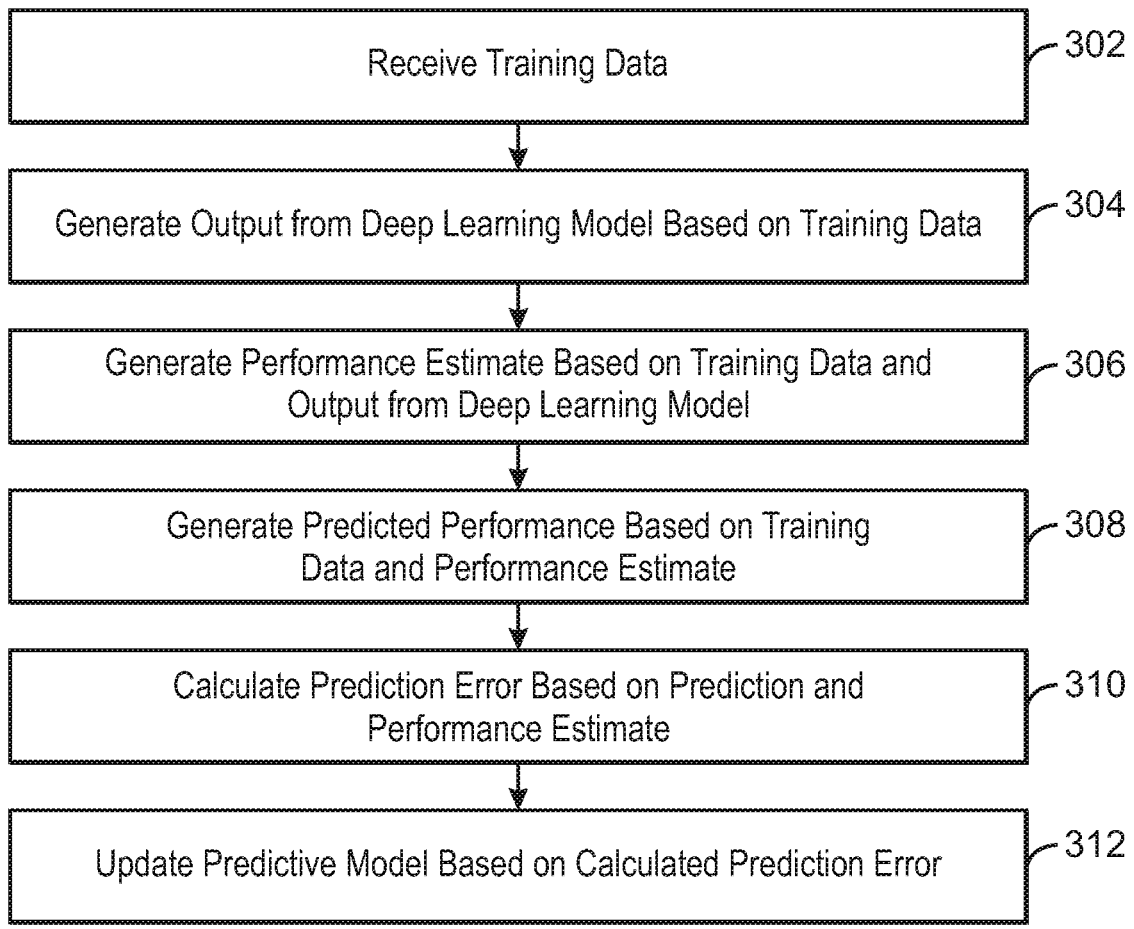
FIG. 3 is a block diagram of an example method that can train a predictive model to control a deployed DL model.

FIG. 3 is a process flow diagram of an example method that can train a predictive model to control a deployed DL model. The method 300 can be implemented with any suitable computing device, such as the computing device 500A of FIG. 5A and is described with reference to the system 200 of FIG. 2. For example, the method described below can be implemented by the processor 502 of FIG. 5A or the processor 802 of FIG. 8A. The method 300 can be used to train a predictive model based on a predictive error between a performance estimation and the predicted performance of the predictive model.

At block 302, training data is received. For example, the training data may be a set of images or video frames, among other types of suitable training data.

At block 304, output from the deployed model is generated based on the training data. For example, the output may be a detected object or a classification of an image. In some examples, the output may also include runtime performance information such as timestamps or duration of processing for the detection or classification, memory usage statistics, battery usage statistics, and accuracy information.

At block 306, a performance estimate is generated based on the training data and output from the deployed model. For example, the performance estimate may be an estimate runtime performance, an estimated memory usage, an estimated battery usage, or an estimated accuracy. In some examples, the performance estimate may be a measurement that provides of performance estimate over a specified time horizon.

At block 308, a predicted performance is generated based on the training data and the performance estimate. For example, the predicted performance may be the predicted performance of the deployed model given the input data over a specified time horizon.

At block 310, a prediction error is calculated based on the prediction and the performance estimate. For example, the prediction error may be the difference between the prediction and the performance estimate.

At block 312, the predictive model is updated based on the calculated prediction error. For example, any number of parameters of the predictive model may be updated to reduce the prediction error.

The process flow diagram of FIG. 3 is not intended to indicate that all of the operations of the method 300 are to be included in every case. Additionally, the method 300 can include any suitable number of additional operations. For example, additional iterations of method 300 may be performed such that the predictive model is modified based on the predictive error until the predictive error does not exceed a threshold error.

Figure 4:
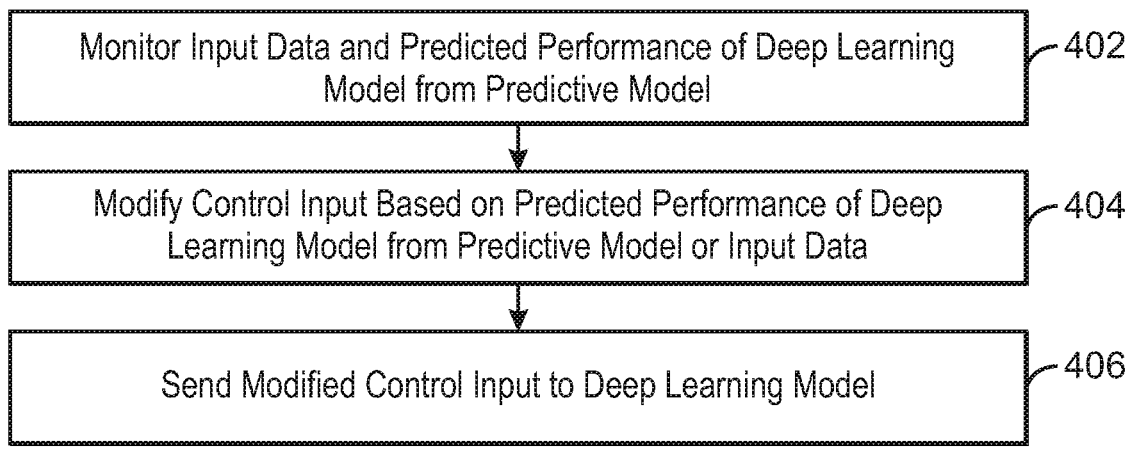
FIG. 4 is a block diagram of an example method that can control deployed DL models via a predictive model.

FIG. 4 is a process flow diagram of an example method that can control deployed DL models via a predictive model. The method 400 can be implemented with any suitable computing device, such as the computing devices 500A and 500B of FIGS. 5A and 5B, and is described with reference to the systems 100 of FIG. 1. For example, the methods described below can be implemented by the processor 502 of FIGS. 5A and 5B or the processor 802 of FIGS. 8A and 8B.

At block 402, input data and predicted performance of a DL model from a predictive model are monitored. For example, the input data may include images or frames of a video. The predicted performance may be a measure of a runtime performance, a memory usage, a battery drain, or an accuracy.

At block 404, a control input is modified based on the predicted performance of the DL model from the predictive model or the input data. For example, the control input may be modified in response to detecting a change to the input data that exceeds a threshold value. In some examples, the control input may be modified in response to detecting a failure of the DL model. In various examples, the control input is modified to optimize a predefined performance criterion over a specified time horizon.

At block 406, the modified control input is sent to the DL model. For example, the modified control input may be sent to a deployed DL model on an edge device. In various examples, the modified control input may also be received and processed by a predictive model on the edge device.

The process flow diagram of FIG. 4 is not intended to indicate that all of the operations of the method 400 are to be included in every case. Additionally, the method 400 can include any suitable number of additional operations. For example, the method 200 may include generating an alert in response to detecting a change in the predicted performance of the DL model or a failure of the DL model.

In various scenarios, the techniques described herein may be implemented in a cloud computing environment. As discussed in more detail below in reference to at least FIGS. 5-8, a computing device configured to control deployed DL models via predictive models may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Examples of characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Examples of service models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Examples of deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5A:
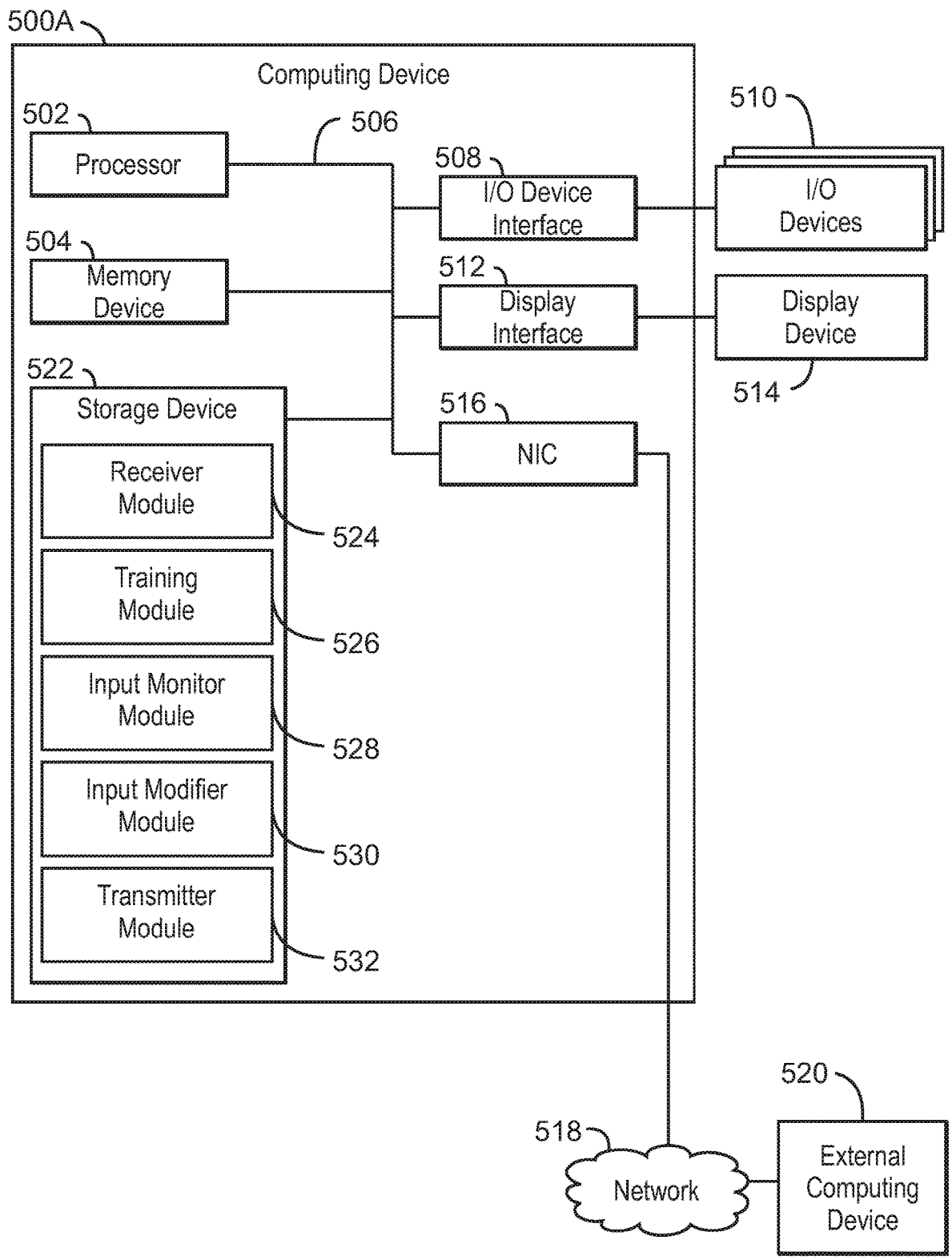
FIG. 5A is a block diagram of an example computing device that can control DL learning models via predictive models.

FIG. 5A is block diagram of an example computing device that can control deployed DL models via predictive models. The computing device 500A may be for example, a server, desktop computer, laptop computer, or tablet computer. In some examples, computing device 500A may be a cloud computing node. Computing device 500A may be described in the general context of computer system executable instructions, such as program modules, being executed by a computer system. Generally, program modules may include routines, programs, objects, components, logic, data structures, and so on that perform particular tasks or implement particular abstract data types. Computing device 500A may be practiced in distributed cloud computing environments where tasks are performed by remote processing devices that are linked through a communications network. In a distributed cloud computing environment, program modules may be located in both local and remote computer system storage media including memory storage devices.

The computing device 500A may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500A to one or more I/O devices 510.

The I/O devices 510 may include, for example, a keyboard and a pointing device, wherein the pointing device may include a touchpad or a touchscreen, among others. The I/O devices 510 may be built-in components of the computing device 500A, or may be devices that are externally connected to the computing device 500A.

The processor 502 may also be linked through the system interconnect 506 to a display interface 512 adapted to connect the computing device 500A to a display device 514. The display device 514 may include a display screen that is a built-in component of the computing device 500A. The display device 514 may also include a computer monitor, television, or projector, among others, that is externally connected to the computing device 500A. In addition, a network interface controller (NIC) 516 may be adapted to connect the computing device 500A through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500A through the network 518. In some examples, external computing device 520 may be an external webserver 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device 522 may include a receiver module 524, a training module 526, and a predictive controller module 528. The receiver module 524 can receive a data input and a predicted performance of a DL model deployed on an edge device from a predictive model. For example, the data input may be images or frames of video. In various examples, the predicted performance may include a runtime performance, a memory usage, a battery drain, an accuracy, or any combination thereof. The training module 526 can train the predictive model based on a predictive error between a performance estimation and output of the predictive model. For example, the output of the predictive model is based on a training input, and the performance estimation is based on the training input and an output of the DL model. The predictive controller module 528 can modify a control input for the DL model based on the data input and the predicted performance. For example, the predictive controller module 528 may be a predictive model and an optimization unit as described in FIG. 1. In some examples, the predictive controller module 528 can modify the control input based on the predicted performance in response to detecting a change to the input data that exceeds a threshold value. In various examples, the predictive controller module 528 can modify the control input based on the predicted performance in response to detecting a failure of the DL model. The predictive controller module 528 may modify the control input to optimize a predefined performance criterion over a specified time horizon. The predictive controller module 528 may then send the control input to the deployed DL model to modify performance of the DL model.

It is to be understood that the block diagram of FIG. 5A is not intended to indicate that the computing device 500A is to include all of the components shown in FIG. 5A. Rather, the computing device 500A can include fewer or additional components not illustrated in FIG. 5A (e.g., additional memory components, embedded controllers, modules, additional network interfaces, etc.). For example, the processor may switch the receiving of the control input between a data buffer, the deployed model, and the predictive model. Furthermore, any of the functionalities of the receiver module 524, the training module 526, and the controller module 528 may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 524, training module 526, and controller module 528 can be implemented with logic, wherein the logic, as referred to herein, can include any suitable hardware (e.g., a processor, among others), software (e.g., an application, among others), firmware, or any suitable combination of hardware, software, and firmware.

Figure 5B:
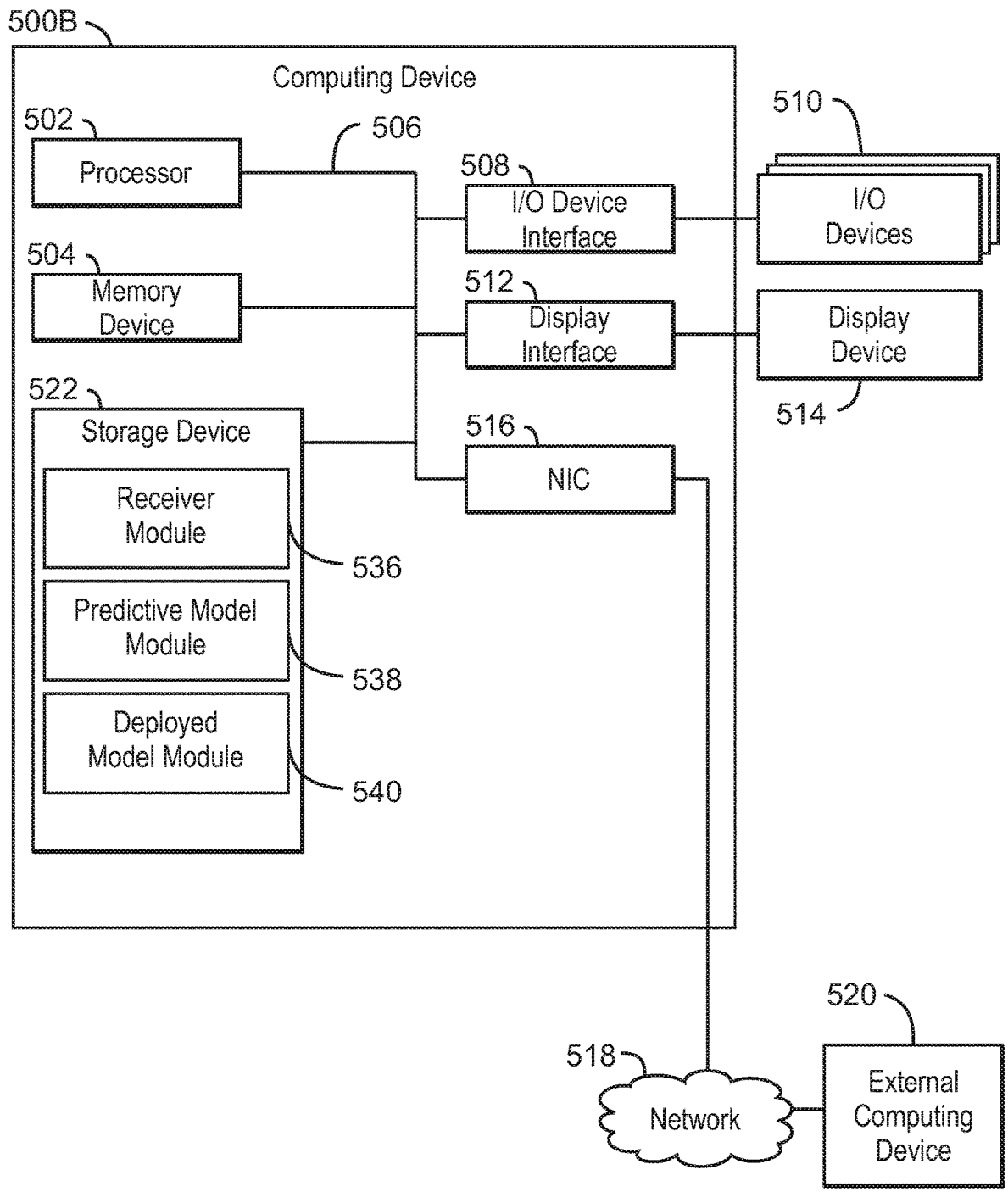
FIG. 5B is a block diagram of an example computing device that can be controlled using DL learning models via predictive models.

FIG. 5B is a block diagram of an example computing device that can be controlled using DL learning models via predictive models. The computing device 500B of FIG. 5A has similarly numbered elements has FIG. 5A. The computing device 500B may be for example, an edge device, such as a, laptop computer, tablet computer, or a smartphone.

The storage device 522 of the computing device 500B also includes a receiver module 536. In various examples, the receiver module 536 receives input from an external computing device 520. For example, the input may be modified input from the computing device 500A of FIG. 5A.

The storage device 522 of the computing device 500B also further includes predictive model module 538. In some examples, the predictive model module 538 can receive a predictive model trained to predict output of a deployed model. For example, the predictive model may be trained using the method 300 by the computing device 500A. The predictive model module 538 can receive input and predict an output of a deployed model for the received input. For example, the predictive model module 538 can predict a detected object in an image or predict a classification of an image into one or more classes. In various examples, the predictive model module 538 can send the predicted output to an external computing device 520, such as the computing device 500A.

The storage device 522 of the computing device 500B includes a deployed model module 540. The deployed model module 540 may receive a trained deployed model. The deployed model may have been trained to detect objects in images or classify images. The deployed model module 540 can receive input, such as an image, and detect an object in the image or classify the image. In various examples, the deployed model module 538 can send the detections or classifications to the predictive model module 538.

It is to be understood that the block diagram of FIG. 5B is not intended to indicate that the computing device 500B is to include all of the components shown in FIG. 5B. Rather, the computing device 500B can include fewer or additional components not illustrated in FIG. 5B (e.g., additional memory components, embedded controllers, modules, additional network interfaces, etc.). For example, the processor may switch the receiving of the control input between a data buffer, the deployed model, and the predictive model. Furthermore, any of the functionalities of the receiver module 536, the predictive model module 538, and the deployed model module 540 may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 536, the predictive model module 538, and the deployed model module 540 can be implemented with logic, wherein the logic, as referred to herein, can include any suitable hardware (e.g., a processor, among others), software (e.g., an application, among others), firmware, or any suitable combination of hardware, software, and firmware.

Figure 6:
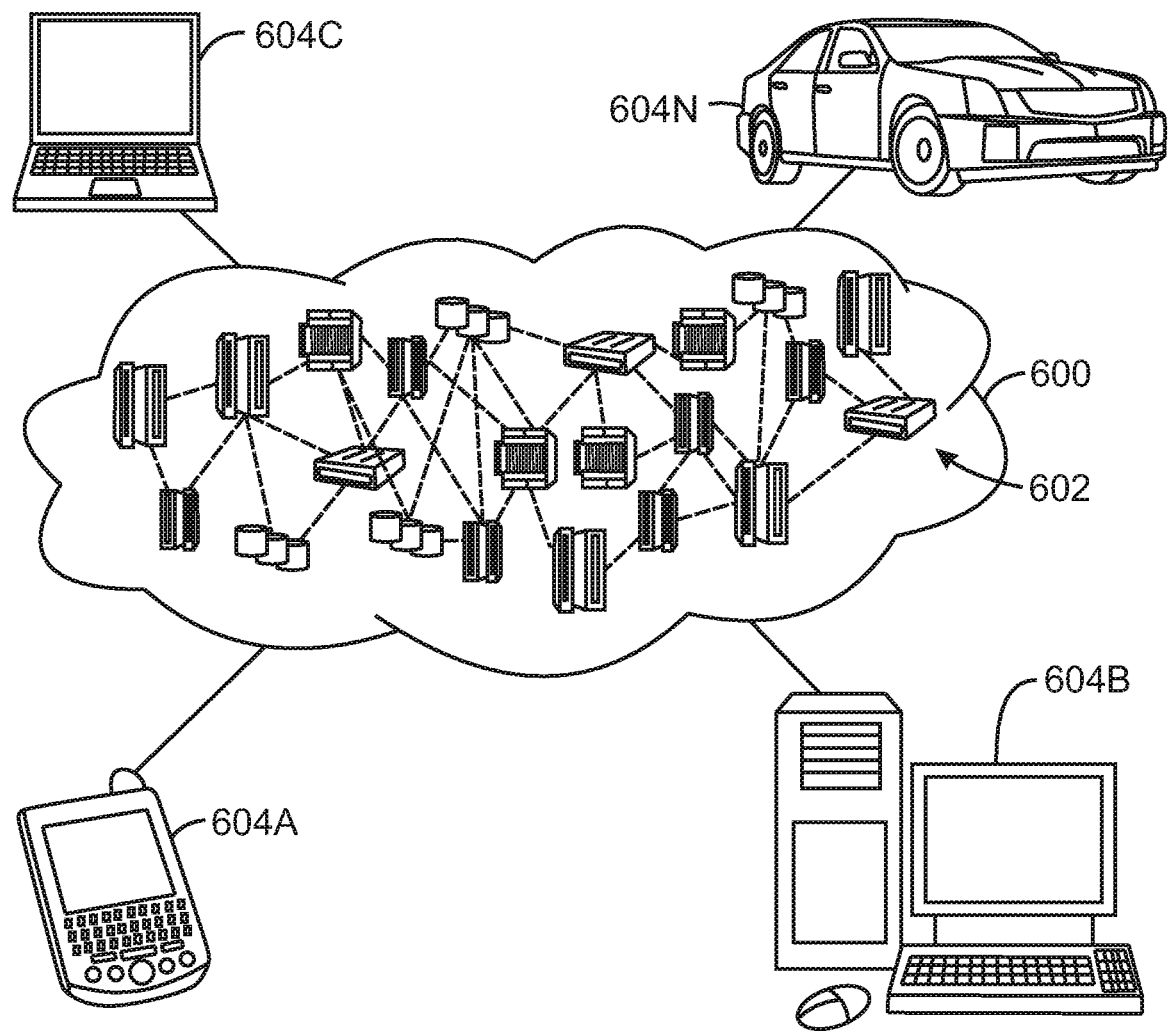
FIG. 6 is a process flow diagram of an example cloud computing environment according to embodiments described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
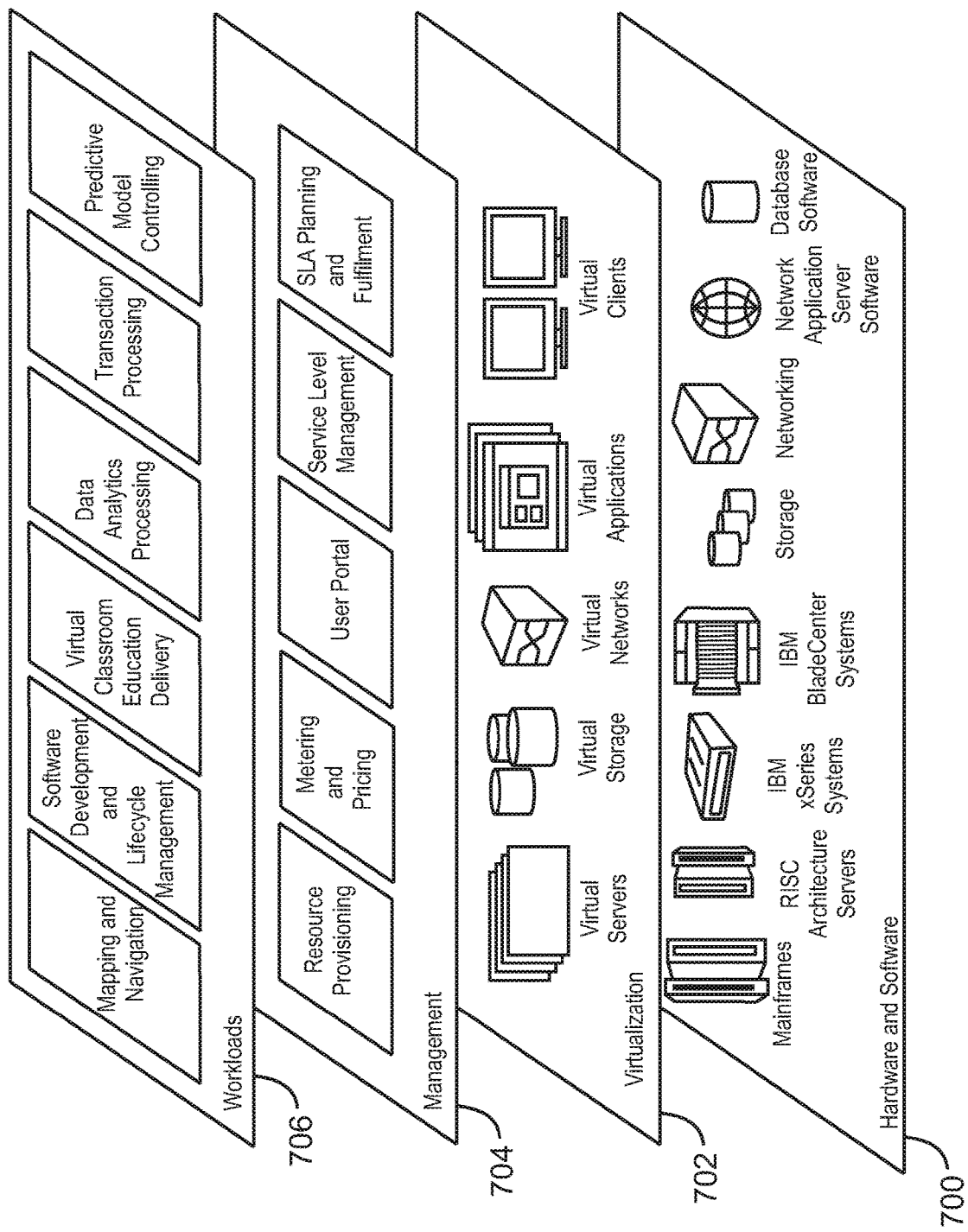
FIG. 7 is a process flow diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and predictive model controlling.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8A:
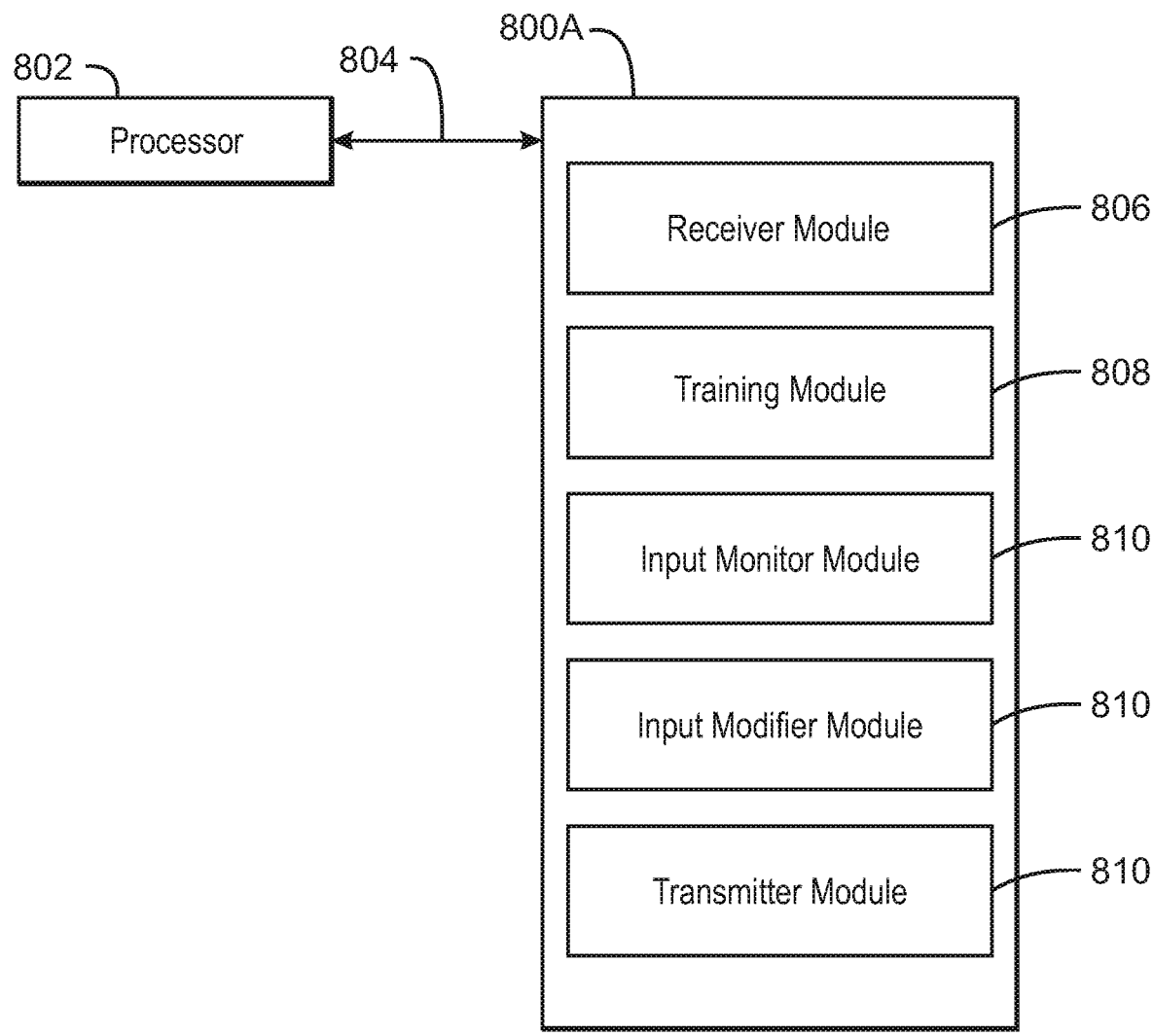
FIG. 8A is an example tangible, non-transitory computer-readable medium that can control deployed DL models via predictive models.

Referring now to FIG. 8A, a block diagram is depicted of an example tangible, non-transitory computer-readable medium 800A that can control deployed DL models via predictive models. The tangible, non-transitory, computer-readable medium 800A may be accessed by a processor 802 over a computer interconnect 804. Furthermore, the tangible, non-transitory, computer-readable medium 800A may include code to direct the processor 802 to perform the operations of the methods 200 and 300 of FIGS. 2 and 3.

The various software components discussed herein may be stored on the tangible, non-transitory, computer-readable medium 800A, as indicated in FIG. 8A. For example, a receiver module 806 includes code to monitor an input data and a predicted performance of a DL model from a predictive model. A training module 808 includes code to train the predictive model based on a predictive error between a performance estimation and output of the predictive model. For example, the output of the predictive model may be based on a training input, and the performance estimation is based on the training input and an output of the DL model. A predictive controller module 810 includes code to modify a control input based on the input data and the predicted performance of the DL model. The predictive controller module 810 also includes code to send the modified control input to the DL model. For example, the predictive controller module 810 includes code to modify the control input to optimize a predefined performance criterion over a specified time horizon. In some examples, the predictive controller module 810 includes code to modify the control input based on the predicted performance in response to detecting a change to the input data that exceeds a threshold value. In various examples, the predictive controller module 810 includes code to modify the control input based on the predicted performance in response to detecting a failure of the DL mode. It is to be understood that any number of additional software components not shown in FIG. 8 may be included within the tangible, non-transitory, computer-readable medium 800, depending on the particular application. For example, the computer-readable medium 800 may also include code to generate an alert in response to detecting a change in the predicted performance of the DL model or a failure of the DL model.

Figure 8B:
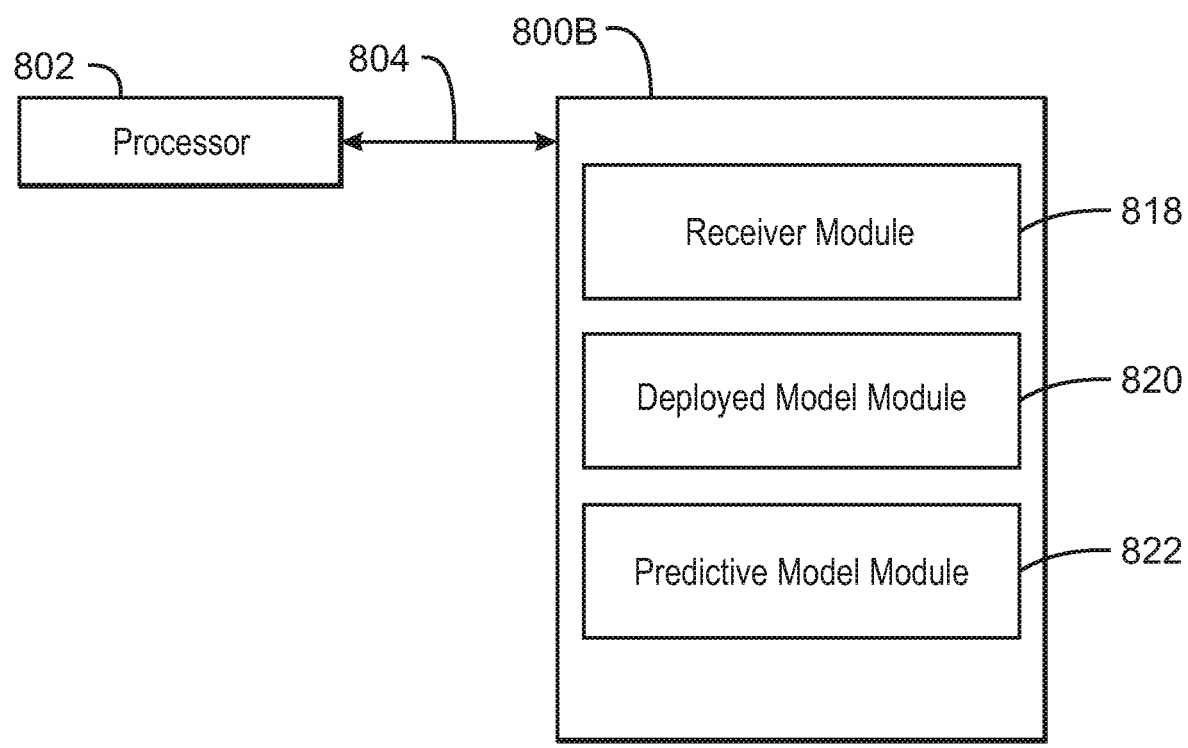
FIG. 8B is an example tangible, non-transitory computer-readable medium that can stored deployed DL models to be controlled via predictive models.

FIG. 8B is an example tangible, non-transitory computer-readable medium that can stored deployed DL models to be controlled via predictive models. The computer-readable medium 800B of FIG. 8B includes similarly numbered elements from FIG. 8B. For example, the tangible, non-transitory, computer-readable medium 800B may also be accessed by a processor 802 over a computer interconnect 804.

Various software components discussed herein may be stored on the tangible, non-transitory, computer-readable medium 800B, as indicated in FIG. 8B. For example, a receiver module 818 includes code to receive input from an external computing device 520. For example, the input may be modified input from a computing device executing computer readable medium 800A. A predictive model module 820 includes code to receive a predictive model trained to predict output of a deployed model. For example, the predictive model may be trained using the method 300 by the computing device 500A using the computer-readable medium 800A. The predictive model module 820 can receive input and predict an output of a deployed model for the received input. For example, the predictive model module 820 can include code to predict a detected object in an image or predict a classification of an image into one or more classes. In various examples, the predictive model module 820 can include code to send the predicted output to an external computing device 520, such as the computing device 500A.

A deployed model module 822 includes code to receive a trained deployed model. In various examples, the deployed model may have been trained to detect objects in images or classify images. The deployed model module 822 can also include code to receive input, such as an image, and detect an object in the image or classify the image. In various examples, the deployed model module 822 can include code to send the detections or classifications to the predictive model module 538.

The flowchart and block diagrams in the figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIGS. 8A and 8B may be included within the tangible, non-transitory, computer-readable media 800A and 800B, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a hardware processor to:
   receive, at a fog layer used to orchestrate a resource-constrained edge device, a data input and a predicted performance of a deep learning (DL) model deployed on the resource constrained edge device from a predictive model trained to predict a performance characteristic of the deployed DL model on the resource constrained edge device, wherein the predictive model is trained based on training data and output from a performance estimator that estimates a performance of the deployed DL based on the training data and output from the DL model generated on the training data, wherein the predictive model is on the resource constrained edge device and wherein the resource-constrained edge device is not part of the fog layer;
   redirect, by the fog layer, the data input to the predictive model;
   modify a control input for the deployed DL model based on the data input and the predicted performance; and
   send, by the fog layer, the modified control input to the deployed DL model to modify performance of the deployed DL model on the resource constrained edge device.

2. The system of claim 1, wherein the hardware processor is to train the predictive model based on a predictive error between a performance estimation and output of the predictive model, wherein the output of the predictive model is based on a training input, and the performance estimation is based on the training input and an output of the deployed DL model.

3. The system of claim 1, wherein the predicted performance comprises a runtime performance, battery drain on the resource constrained edge device, a memory usage, an accuracy, or any combination thereof.

4. The system of claim 1, wherein the hardware processor is to modify the control input based on the predicted performance in response to detecting a change to the data input that exceeds a threshold value.

5. The system of claim 1, wherein the hardware processor is to modify the control input based on the predicted performance in response to detecting that the predicted performance comprises a predicted failure of the deployed DL model.

6. The system of claim 1, wherein the control input is modified to optimize a predefined performance criterion over a specified time horizon.

7. The system of claim 1, wherein the hardware processor is to switch the receiving of the control input between a data buffer, the deployed model, and the predictive model.

8. A computer-implemented method, comprising:
   monitoring, via a processor on a fog layer used to orchestrate a resource-constrained edge device, an input data and a predicted performance of a deep learning (DL) model deployed on the resource constrained edge device from a predictive model trained to predict a performance characteristic of the deployed DL model on the resource constrained edge device, wherein the predictive model is trained based on training data and output from a performance estimator that estimates a performance of the deployed DL based on the training data and output from the DL model generated on the training data, wherein the predictive model is on the resource constrained edge device and wherein the predicted performance is a frames per second at which the DL model runs on the resource constrained edge device;
   redirecting, by the processor, the input data from the deployed DL model on the resource-constrained edge device to the predictive model on the resource-constrained edge device;
   modifying, via the processor, a control input based on the input data and the predicted performance of the deployed DL model; and
   sending, via the processor, the modified control input to the deployed DL model.

9. The computer-implemented method of claim 8, wherein the control input is modified in response to detecting a change in the input data that exceeds a threshold change.

10. The computer-implemented method of claim 8, wherein the control input is modified in response to detecting a change in the predicted performance of the deployed DL model, wherein the change in the predicted performance is an increase in the frames per second at which the DL model runs.

11. The computer-implemented method of claim 8, wherein modifying the control input comprises modifying a parameter of the deployed DL model to optimize a predefined performance criterion over a specified time horizon.

12. The computer-implemented method of claim 8, comprising generating an alert in response to detecting a change in the predicted performance of the deployed DL model or a predicted failure of the deployed DL model.

13. The computer-implemented method of claim 8, comprising training the predictive model based on a predictive error between a performance estimation and the predicted performance of the predictive model, wherein the performance estimation is based on a training input and an output performance characteristic of the deployed DL model, and the predicted performance of the predictive model is based on the training input and the performance estimation.

14. The computer-implemented method of claim 13, wherein the predictive model is modified based on the predictive error until the predictive error does not exceed a threshold error.

15. A computer program product for controlling deployed deep learning (DL) models, the computer program product comprising a computer-readable storage medium having program code embodied therewith, the program code executable by a processor to cause the processor to:
  monitor, at a fog layer used to orchestrate a resource-constrained edge device, an input data and a predicted performance of a DL model deployed on the resource constrained edge device from a predictive model trained to predict a performance characteristic of the deployed DL model on the resource constrained edge device, wherein the predictive model is trained based on training data and output from a performance estimator that estimates a performance of the deployed DL based on the training data and output from the DL model generated on the training data, and wherein the predicted performance comprises a battery drain on the resource constrained edge device, and wherein the predictive model is on the resource constrained edge device and wherein the resource-constrained edge device is not part of the fog layer;
  redirect, by the fog layer, the input data to the predictive model;
  modify a control input based on the input data and the predicted performance of the deployed DL model; and
  send, by the fog layer, the modified control input to the deployed DL model.

16. The computer program product of claim 15, further comprising program code executable by the processor to modify the control input based on the predicted performance in response to detecting a change to the input data that exceeds a threshold value.

17. The computer program product of claim 15, further comprising program code executable by the processor to modify the control input based on the predicted performance in response to detecting that the predicted performance comprises a predicted failure of the deployed DL model.

18. The computer program product of claim 15, further comprising program code executable by the processor to modify the control input to optimize a predefined performance criterion over a specified time horizon.

19. The computer program product of claim 15, further comprising program code executable by the processor to generate an alert in response to detecting a change in the predicted performance of the deployed DL model or a predicted failure of the deployed DL model.

20. The computer program product of claim 15, further comprising program code executable by the processor to train the predictive model based on predictive error between a performance estimation and output of the predictive model, wherein the output of the predictive model is based on a training input, and the performance estimation is based on the training input and an output of the deployed DL model.

\* \* \* \* \*